(12) United States Patent
Wang et al.

(10) Patent No.: US 7,570,409 B1
(45) Date of Patent: Aug. 4, 2009

(54) RADIATION MODULATION BY REFLECTION FROM CONTROLLED COMPOSITE MATERIAL

(75) Inventors: Shih-Yuan Wang, Palo Alto, CA (US); Alexandre Bratkovski, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 11/581,193

(22) Filed: Oct. 12, 2006

(51) Int. Cl.
*G02F 1/00* (2006.01)
*H01L 31/00* (2006.01)
*G01N 21/55* (2006.01)

(52) U.S. Cl. .......................... 359/237; 257/17; 356/445

(58) Field of Classification Search .............. 359/237, 359/299, 310, 321, 248, 342, 344–345, 238; 29/602.1, 417, 846; 372/20, 28, 44.01, 50.1, 372/55; 257/17, 21, 79, 417, 622; 356/445, 356/317; 430/2, 21; 250/306
See application file for complete search history.

(56) References Cited

U.S. PATENT DOCUMENTS

| | | | |
|---|---|---|---|
| 6,859,114 B2 | 2/2005 | Eleftheriades et al. | |
| 7,106,494 B2 | 9/2006 | Osipov et al. | |
| 2003/0227415 A1 | 12/2003 | Joannopoulis et al. | |
| 2006/0044212 A1 | 3/2006 | Wang et al. | |
| 2006/0109540 A1 | 5/2006 | Kueks et al. | |

FOREIGN PATENT DOCUMENTS

WO    WO2006/015478 A1    2/2006

*Primary Examiner*—Scott J Sugarman
*Assistant Examiner*—Dawayne A Pinkey (57) ABSTRACT

Modulation of electromagnetic radiation is described in which an incident radiation beam is directed toward a surface of a composite material and at least partially reflects to form a reflected radiation beam. The composite material comprises an arrangement of electromagnetically reactive cells of small dimension relative to a wavelength of the incident radiation beam, and exhibits at least one of a negative effective permeability and a negative effective permittivity for at least one frequency. A modulation signal is applied to the composite material to cause a variation in at least one of the effective permeability and the effective permittivity, at least one characteristic of the reflected radiation beam being modulated according to the modulation signal.

23 Claims, 6 Drawing Sheets

RADIATION MODULATION BY REFLECTION FROM CONTROLLED COMPOSITE MATERIAL

STATEMENT REGARDING FEDERALLY SPONSORED RESEARCH OR DEVELOPMENT

This invention was made with Government support under Agreement No. HR0011-05-3-0002, awarded by DARPA. The Government has certain rights in the invention.

FIELD

This patent specification relates to the modulation of electromagnetic radiation, with particular applicability to electromagnetic radiation in the microwave and/or optical frequency ranges.

BACKGROUND

Devices for modulating electromagnetic radiation represent fundamental building blocks for many technological endeavors. Modulation refers to the variation of a property in an electromagnetic wave or signal, such as amplitude, frequency, phase, spectral content, or any other measurable characteristic. In addition to dynamic modulation processes that are operable in real time relative to a period of the radiation, modulation further refers to the tuning or adjustment, whether it be static or dynamic, of a system or device that varies any such measurable characteristic of the radiation.

For frequencies in the microwave range, modulation is often achieved in solid state devices by variation of inputs and/or operating parameters for electrical components such as heterojunction bipolar transistors, metal-semiconductor field effect transistors, and Gunn diodes, and/or in vacuum tube based devices such as magnetrons, klystrons, and traveling wave tubes, in each case in conjunction with associated passive electrical components. For optical frequencies, modulation is often achieved using devices based on electrooptic and/or magnetooptic materials such as calcite, quartz, and lithium niobate that change their refractive index responsive to applied control signals, the materials being arranged into Mach-Zehnder interferometers (MZIs) or similar devices converting induced phase changes into amplitude changes by interference effects. Other electrooptical modulators include electroabsorption modulators variably absorbing the incident signal according to an applied electric field, and acoustic wave modulators using high-frequency sound traveling within a crystal or a planar wave guide to deflect light from one place to another.

For each of the above schemes, practical issues arise in regard to one or more of modulation speed, dynamic range, spectral range of operation, noise performance, channel selectivity, device cost, heat dissipation, device size, tunability, and device power consumption. It would be desirable to increase the number of device solutions available for any particular radiation modulation requirement, and/or to provide for improved radiation modulation with respect to one or more of the above practical issues. Other issues arise as would be apparent to one skilled in the art in view of the present disclosure.

SUMMARY

In one embodiment, a method for modulating electromagnetic radiation is provided, comprising directing an incident radiation beam toward a surface of a composite material, the composite material having an arrangement of electromagnetically reactive cells of small dimension relative to a wavelength of the incident radiation beam. At least one of an effective permeability and an effective permittivity of the composite material is negative for at least one frequency. The method further includes receiving a reflected radiation beam resulting from at least partial reflection of the incident radiation beam from the surface, and applying a modulation signal to the composite material to cause a variation in at least one of the effective permeability and the effective permittivity. At least one characteristic of the reflected radiation beam is thereby modulated according to the modulation signal.

Also provided is a device for modulating radiation, comprising a composite material formed by an arrangement of electromagnetically reactive cells of small dimension relative to a wavelength of an incident radiation beam. The composite material has a surface from which the incident radiation beam at least partially reflects to result in a reflected radiation beam. The composite material has at least one of a negative effective permeability and a negative effective permittivity for at least one frequency. At least one of an inductive property and a capacitive property of the electromagnetically reactive cells is controlled by application of a modulation signal such that at least one characteristic of the reflected radiation beam is modulated according to the modulation signal.

Also provided is a tunable add-drop multiplexer for adding channels to a radiation beam and removing channels from the radiation beam. The tunable add-drop multiplexer comprises a plurality of add-drop stages disposed in serial radiative communication relative to the radiation beam, each add-drop stage being configured to drop a channel at a drop frequency and to pass at least one channel at a pass frequency different than the drop frequency. Each add-drop stage comprises a composite material formed by an arrangement of electromagnetically reactive cells of small dimension relative to a wavelength of the radiation beam, the composite material having both a positive effective permeability and a positive effective permittivity at the pass frequency and having at least one of a negative effective permeability and a negative effective permittivity at the drop frequency. The composite material has a surface that passes the at least one channel at the pass frequency by reflection therefrom and that drops the drop channel at the drop frequency by refraction thereinto. The tunable add-drop multiplexer further comprises, for each add-drop stage, a modulation signal application device for applying a modulation signal to the composite material that varies the drop frequency by varying at least one of a capacitive property and inductive property of the arrangement of electromagnetically reactive cells.

Also provided is a Mach-Zehnder apparatus for modulating an incident radiation beam. The Mach-Zehnder apparatus comprises a radiation splitter that splits the incident radiation beam into a plurality of substantially equal split beams and directs each split beam along a distinct propagation path and a plurality of phase modulators positioned along respective ones of the distinct propagation paths. Each of the phase modulators comprises a composite material modulating the phase of the split beam by reflection from a surface thereof. The composite material comprises an arrangement of electromagnetically reactive cells of small dimension relative to a wavelength of the incident radiation beam, and has at least one of a negative effective permeability and a negative effective permittivity at a frequency of the split beam. The Mach-Zehnder apparatus further comprises, for each of the phase modulators, a modulation signal application device for applying a modulation signal that varies at least one of a capacitive property and inductive property of the arrangement of electromagnetically reactive cells to correspondingly vary the phase of the split beam. The Mach-Zehnder apparatus further comprises a radiation combiner that combines the plurality of phase-modulated split beams into an output radiation beam.

DETAILED DESCRIPTION

Figure 1A:
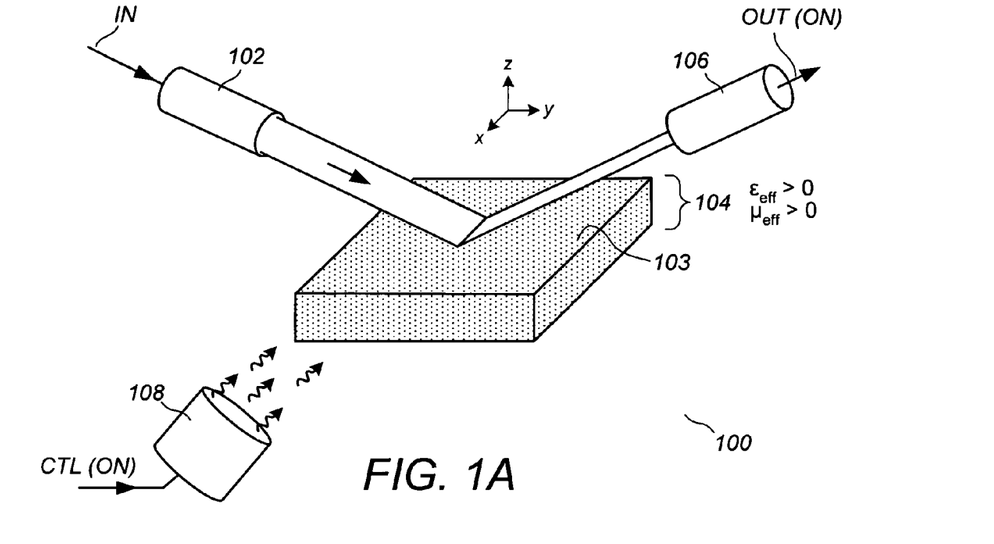
FIGS. 1A-1B illustrate a modulation device according to an embodiment for different states of a modulation signal.
Figure 1B:
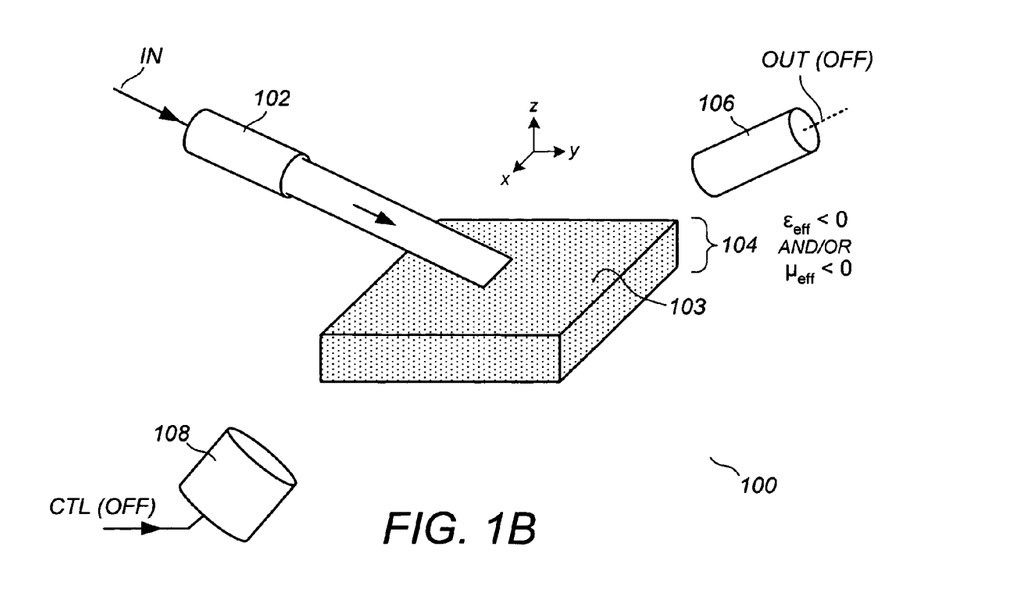

FIGS. 1A-1B illustrate a modulation device 100 according to an embodiment, comprising an input 102, a composite material 104 having a surface 103, an output 106, and a modulation signal application device 108. The input 102 receives an incident radiation beam IN and directs it toward the surface 103 of the composite material 104. At least a portion of the radiation reflects from the surface to form a reflected radiation beam that is collected at the output 106 for transfer to downstream radiation processing devices.

The composite material 104 comprises an arrangement of electromagnetically reactive cells of small dimension (e.g., 20 percent or less) relative to a wavelength of the incident radiation beam, and exhibits at least one of a negative effective permeability and negative effective permittivity for at least one frequency that is at least in a general spectral neighborhood of the incident radiation beam IN. The modulation signal application device 108 applies a modulation signal CTL to the composite material 104 that alters at least one of a capacitive and inductive property of the arrangement of electromagnetically reactive cells such that at least one characteristic of the reflected radiation beam is modulated according to the modulation signal CTL.

The composite material 104 can be selected from a variety of judiciously engineered artificial materials or metamaterials having a large population of small cells, each cell having one or more electrical conductors, that begin to oscillate or resonate at particular frequencies termed resonant frequencies. Resonant cells are known in the art, and examples of two-dimensional and three-dimensional resonant cells can be found, for example, in WO 2003/044897 A1 and U.S. Pat. No. 6,791,432 B2. Near such resonant frequencies, although the individual response of any particular resonant cell can be quite complicated, the aggregate behavior of the population of resonating cells can often be described macroscopically, as if the composite material were a continuous material, except that the permeability term is replaced by an effective permeability $\mu_{eff}$ and the permittivity term is replaced by an effective permittivity $\epsilon_{eff}$. For particular structures and arrangements of the resonant cells, it has been found that the propagation of the electromagnetic radiation is consistent with negative values of the effective permeability $\mu_{eff}$ and/or the effective permittivity $\epsilon_{eff}$ at or near the resonant frequencies.

It has been found that externally controlled variations in the inductive and/or capacitive properties of the resonant cells, even relatively small controlled variations, can substantially vary the macroscopic response of such composite materials. This allows for external control of the effective permeability $\mu_{eff}$ and/or the effective permittivity $\epsilon_{eff}$ on either a local or global basis across the composite material, and on either a timewise static basis or timewise dynamic basis, as dictated by the applied external controls. Examples of the application of external controls to composite materials comprising resonant cells can be found in one or more of the following commonly assigned applications, each of which are incorporated by reference herein: US 2006/0044212A1; US2006/0109540A1; U.S. Pat. No. 7,106,494; and Ser. No. 11/285,910, filed Nov. 23, 2005.

By way of example, and not by way of limitation, the resonant cells can be disposed on a semiconductor substrate having an electrical carrier population that is externally controlled by application of a control radiation beam, as described in U.S. Pat. No. 7,106,494, supra. The presence of carriers (e.g., electrons or holes) affects the capacitive and/or inductive properties by amounts sufficient to alter, and optionally to destroy, the resonance condition so that substantial and useful control of the effective permeability $\mu_{eff}$ and/or the effective permittivity $\epsilon_{eff}$ is achieved. By way of further example, the resonant cells can contain optical gain elements, such as quantum dots, that can vary the effective permeability $\mu_{eff}$ and/or the effective permittivity $\epsilon_{eff}$ while also providing gain for the radiation beam, as described in Ser. No. 11/285,910, supra. By way of further example, the resonant cells can contain split-ring conductive patterns with small transistor circuits or electromechanical switches extended across the gaps thereof, with electrical control signals being applied to partially or fully short out the split-ring conductive element across the gap, thereby varying a capacitive and/or inductive property of the resonant cell. In the particular embodiment of FIGS. 1A-1B, the control signal CTL is an applied to the composite material as an optical signal. However, any of a variety of other devices and strategies can be used to modulate the effective permeability $\mu_{eff}$ and/or the effective permittivity $\epsilon_{eff}$ of the composite material 104 without departing from the scope of the present teachings.

As illustrated in FIG. 1A, when both the effective permeability $\mu_{eff}$ and the effective permittivity $\epsilon_{eff}$ are positive, the incident radiation beam IN will generally reflect from the surface 103 toward the output 106 in accordance with known reflection principles, as it would from an ordinary surface that is fully or partially metallic. The reflection can be specular or diffuse depending on the particular surface characteristics, with specular reflection of smoother surfaces at relatively shallow angles of incidence (e.g., less than 45 degrees) being more preferable as more of the energy will be collectible at the output 106.

However, as the effective permeability $\mu_{eff}$ and/or the effective permittivity $\epsilon_{eff}$ approach negative values, at least some portion of the incident radiation beam IN begins to refract into the composite material 104 and at least one characteristic of the reflected radiation beam becomes affected, such as intensity, phase, frequency, spectral content, or combinations thereof. According to an embodiment, this behavior is harnessed to achieve modulation of the incident radiation beam through modulation of the effective permeability $\mu_{eff}$ and/or the effective permittivity $\epsilon_{eff}$, which in turn are modulated by the modulation signal CTL. A rich variety of modulation schemes are thereby provided, and the modulation can be digital/switchable in nature (e.g., on/off, left/right, channel 1/channel 2) or can be analog in nature (e.g., by analog variations in $\mu_{eff}$ and $\epsilon_{eff}$ in the negative and/or positive regimes). Generally speaking, the particular type of modulation (e.g., phase, intensity, spectral content, etc.) that is achievable by a particular composite material can be empirically determined without undue experimentation. Generally speaking, affectation of the phase, intensity, spectral content, etc., will be more pronounced for frequencies near the resonant frequency. Such modulation can be implemented, using different resonant cell sizes, at a variety of different frequencies ranging from the microwave regime to the optical regime without departing from the scope of the present teachings.

The example of FIGS. 1A-1B represents perhaps the simplest type of modulation in which the modulation device 100 operates as an on-off gate for a monochromatic carrier signal that corresponds to a resonant frequency of the composite material 104. Thus, when no control radiation is applied (FIG. 1B), the composite material significantly negatively refracts the incident beam such that the reflected radiation beam has a relatively low intensity (designated more simply as OFF in FIG. 1B). When control radiation is applied (FIG. 1A), the negatively refracting behavior of the composite material 104 is destroyed such that the reflected radiation beam has a relatively high intensity (designated more simply as ON in FIG. 1A).

Figure 2A:
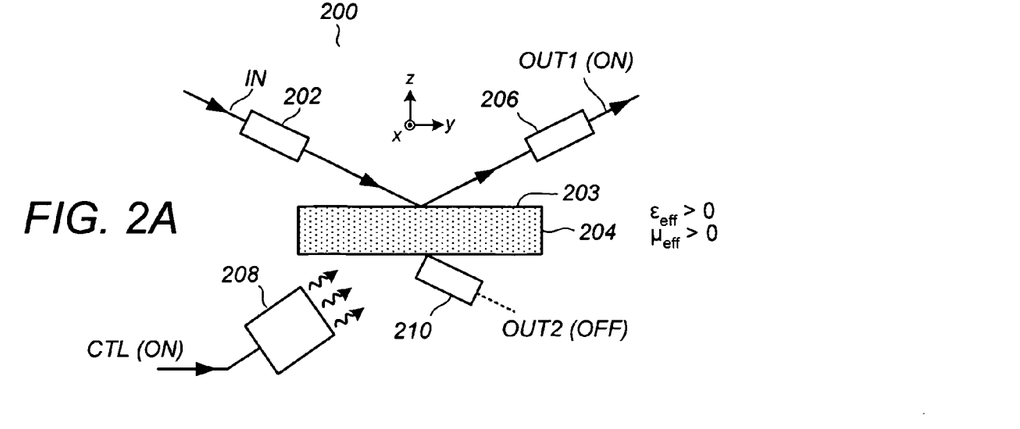
FIGS. 2A-2B illustrate a modulation device according to an embodiment for different states of a modulation signal.
Figure 2B:
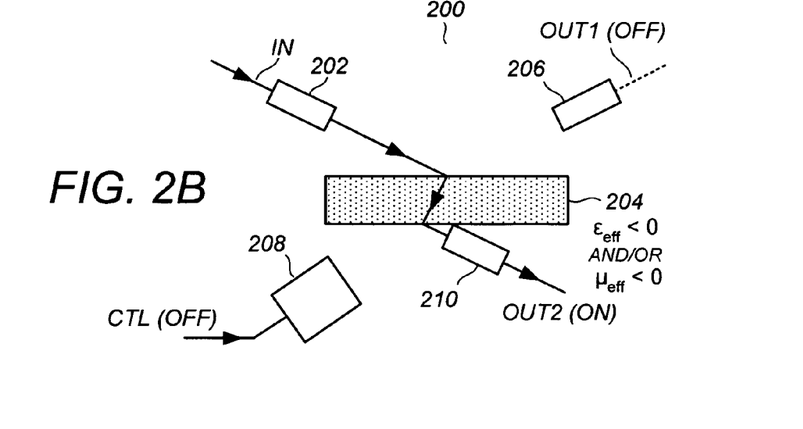

FIGS. 2A-2B illustrate a modulation device 200 according to an embodiment, comprising a composite material 204 having a surface 203 receiving an incident radiation beam from an input 202. Depending on the state of a modulation signal CTL from a modulation signal application device 208, the composite material 204 either reflectively directs the radiation beam toward a first output 206 when both $\mu_{\mathit{eff}}$ and $\epsilon_{\mathit{eff}}$ are positive (FIG. 2A), or refractively directs the radiation beam toward a second output 210 when one or both of $\mu_{\mathit{eff}}$ and $\epsilon_{\mathit{eff}}$ are negative (FIG. 2B). The modulation device 200 is therefore operable as a switching device.

Figure 3:
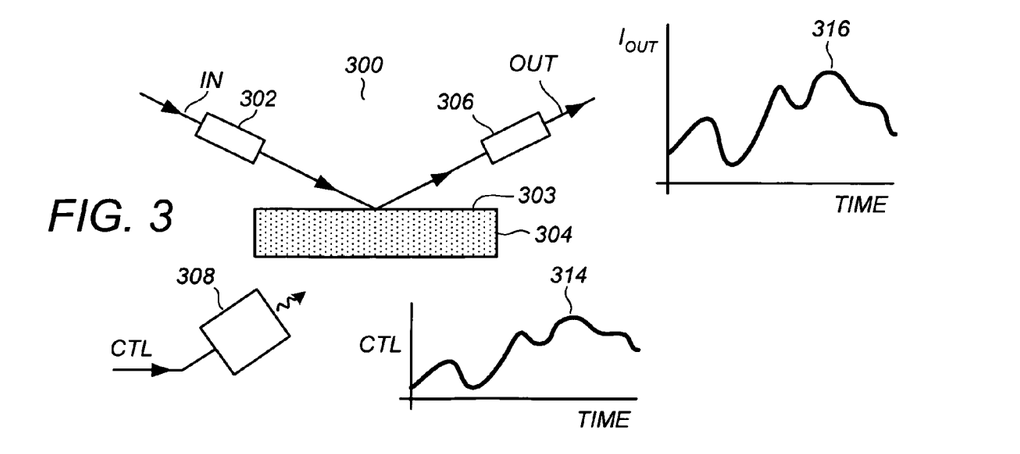
FIG. 3 illustrates a modulation device according to an embodiment and related time plots of a modulation signal and an output intensity signal.

FIG. 3 illustrates a modulation device 300 according to an embodiment and related time plots 314 and 316 of a modulation signal and an output intensity signal, respectively. The modulation device 300 comprises a composite material 304 having a surface 303 receiving an incident radiation beam from an input 302. The composite material 304 reflectively directs the radiation beam toward an output 306 such that an intensity of the reflected radiation beam is a controlled percentage of the intensity of the incident radiation beam that varies according to an analog value of a modulation signal CTL from a modulation signal application device 308. The modulation device 300 is therefore operable as an analog intensity modulator. If gain material such as a distribution of pumped quantum dots is incorporated into the composite material 304, the controlled percentage can be greater than one hundred percent and the modulation device 300 thus operable as a transistor amplifier.

Figure 4A:
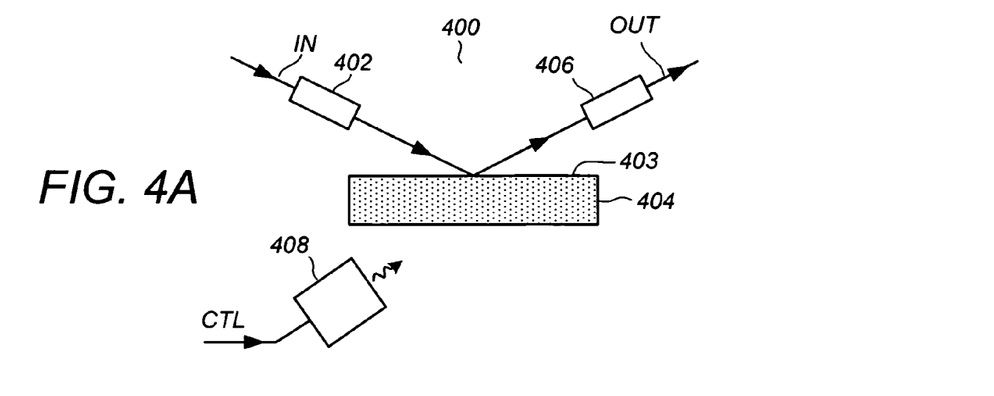
FIG. 4A illustrates a modulation device according to an embodiment.
Figure 4B:
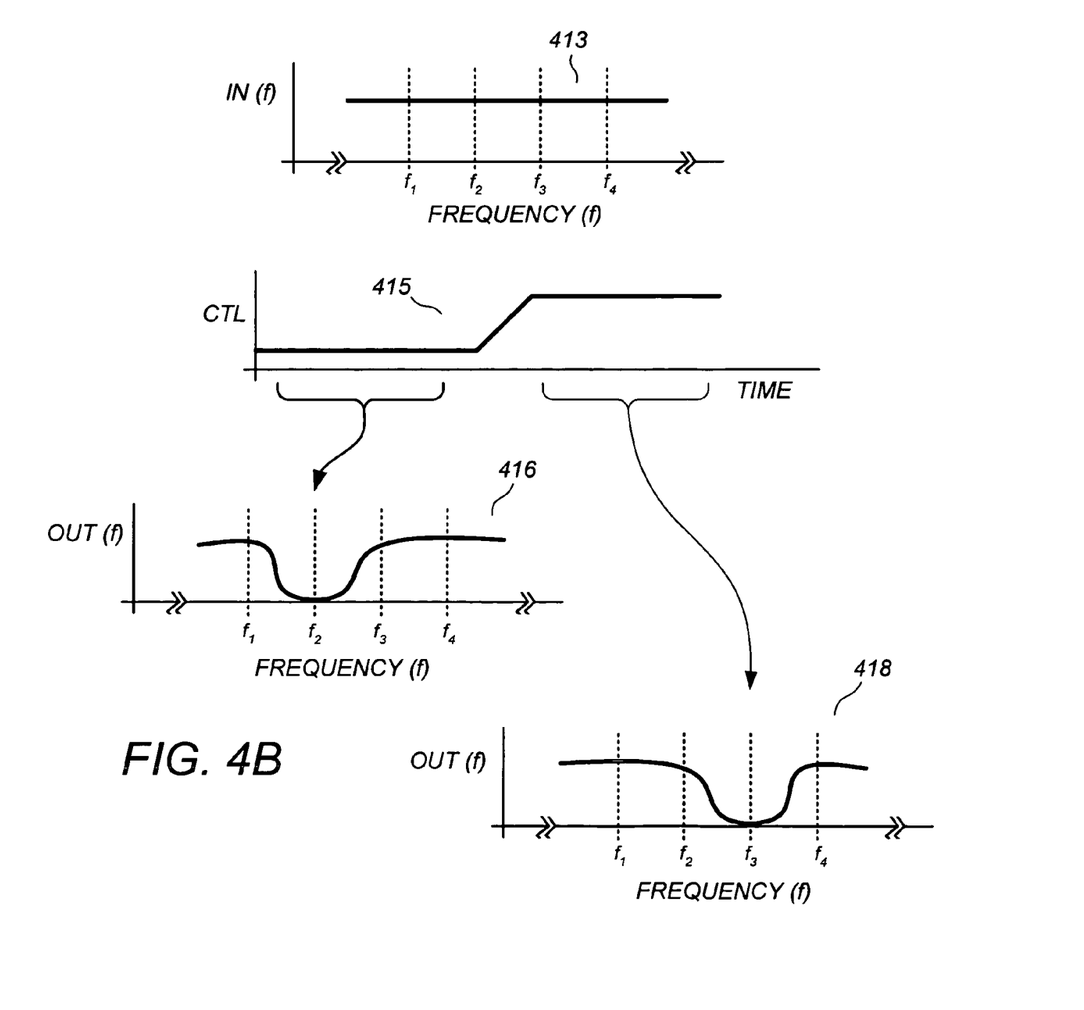
FIG. 4B illustrates a related time plot of a modulation signal, and related frequency spectrum plots of an output signal corresponding to the modulation device of FIG. 4A.

FIG. 4A illustrates a modulation device 400 according to an embodiment. FIG. 4B illustrates a related frequency plot 413 of an incident radiation beam, a related time plot 415 of a modulation signal CTL, and related frequency spectrum plots 416 and 418 of a reflected radiation beam corresponding to the modulation device 400 of FIG. 4A. The modulation device 400 is similar in structure to the modulation device 300 of FIG. 3, comprising an input 402, a composite material 404 having a surface 403, an output 406, and a modulation signal application device 408, except that the composite material 404 is configured and controlled such that the spectral response is modulated (i.e., tuned) by the modulation signal CTL. For a first time interval (which can range anywhere from sub-milliseconds to years without departing from the scope of the present teachings), the composite material 404 primarily reflects for frequencies $f_1$, $f_3$, and $f_4$ and primarily refracts for frequency $f_2$, thereby removing the frequency $f_2$ from the reflected radiation beam while maintaining the frequencies $f_1$, $f_3$, and $f_4$. For a second time interval (which, again, can range anywhere from sub-milliseconds to years) the composite material 404 primarily reflects for frequencies $f_1$, $f_2$, and $f_4$ and primarily refracts for frequency $f_3$, thereby removing the frequency $f_3$ from the reflected radiation beam while maintaining the frequencies $f_1$, $f_2$, and $f_4$. The modulation device 400 is thus operable as a tunable drop filter.

Figure 5:
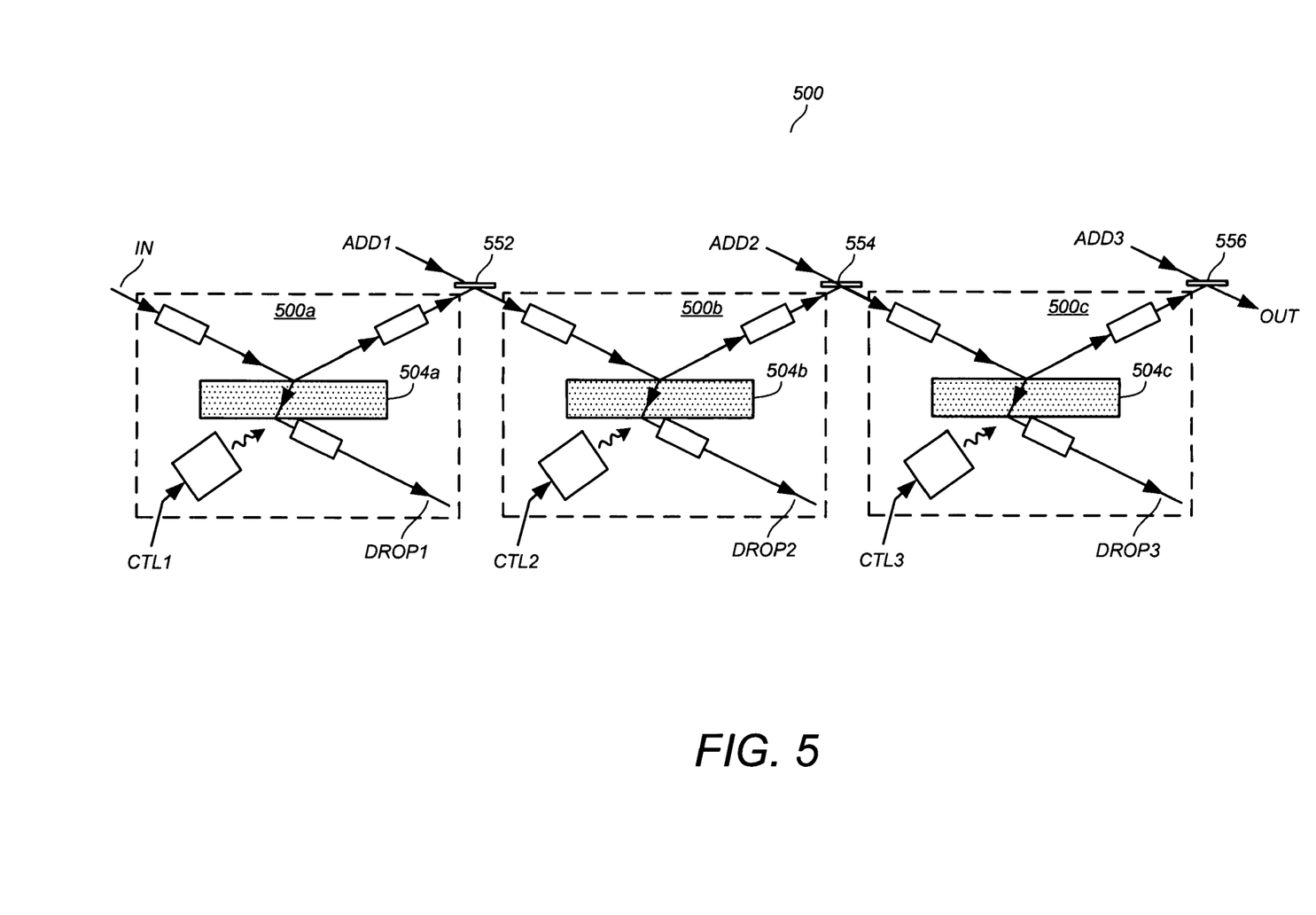
FIG. 5 illustrates an add-drop multiplexer according to an embodiment.

FIG. 5 illustrates a tunable add-drop multiplexer 500 according to an embodiment that harnesses the tunable drop filter capability of the modulation device 400 of FIG. 4A. The tunable add-drop multiplexer 500 comprises several stages 500a, 500b, and 500c, each stage being similar to the modulation device 400 of FIG. 4A and comprising a composite material 504a, 504b, and 504c, respectively, that is similar to the composite material 404 of FIG. 4A. The stages 500a, 500b, and 500c are placed in serial radiative communication with each other relative to an input radiation beam by virtue of partially coated mirrors 552, 554, and 556, which also add the channel signals ADD1, ADD2, and ADD3 as shown. It is to be appreciated that many other schemes for placing the stages 500a-500c in serial radiative communication and for adding channels are within the scope of the present teachings. In operation, each stage 500a-500c removes a respective channel DROP1, DROP2, and DROP3 at a respective frequency from a wavelength division multiplexed radiation beam and replaces that channel with a respective replacement channel ADD1, ADD2, and ADD3. Advantageously, the frequencies at which the channels are dropped are tunable by virtue of the modulation (tuning) signals CTL1, CTL2, and CTL3 as illustrated.

Figure 6:
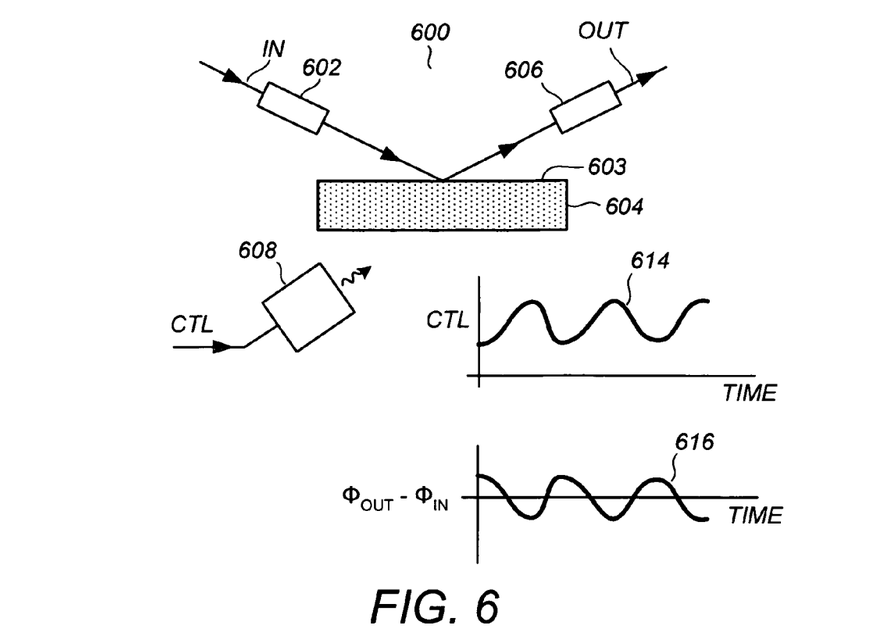
FIG. 6 illustrates a modulation device according to an embodiment and related time plots of a modulation signal and an output phase signal.

FIG. 6 illustrates a modulation device 600 according to an embodiment and related time plots 614 and 616 of a modulation signal and an output phase signal, respectively. The modulation device 600 is similar in structure to the modulation device 300 of FIG. 3, comprising an input 602, a composite material 604 having a surface 603, an output 606, and a modulation signal application device 608, except that the composite material 604 is configured and controlled such that the phase of the incident radiation beam is modulated by the modulation signal CTL. The composite material 604 reflectively directs the radiation beam toward an output 606 such that a phase of the reflected radiation beam relative to the incident radiation beam varies according to an analog (or digital) value of a modulation signal CTL. The modulation device 600 is therefore operable as a phase modulator which, of course, can be used to modulate frequency as well.

Figure 7:
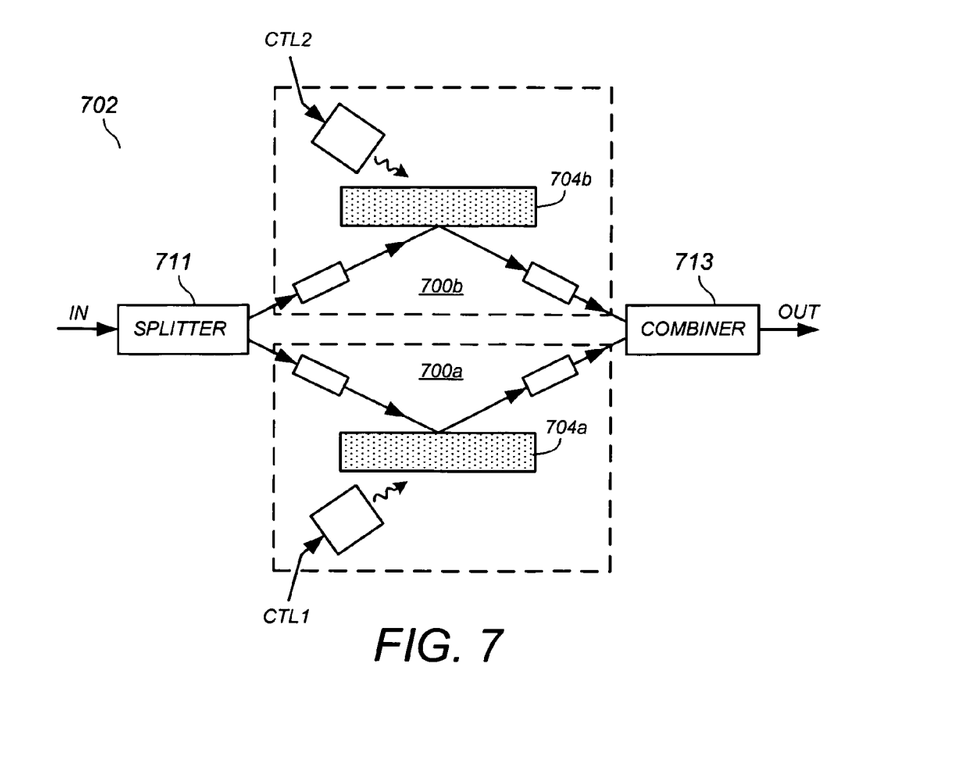
FIG. 7 illustrates a Mach-Zehnder interferometer according to an embodiment.

FIG. 7 illustrates a Mach-Zehnder interferometer (MZI) 702 according to an embodiment that harnesses the phase modulation capability of the modulation device 600 of FIG. 6, comprising a radiation splitter 711 that splits the incident radiation beam into two substantially equal split beams and directs each split beam along a distinct propagation path toward a respective phase modulator 700a and 700b, each being similar to the modulation device 600 of FIG. 6 and comprising composite materials 704a and 704b, respectively. MZI 702 further comprises a radiation combiner 713 that combines the phase-modulated split beams into an output radiation beam. The phase modulators 700a and 700b are driven by coordinated control signals CTL1 and CTL2, usually in a push-pull fashion, to result in an intensity-modulated output which can be digital or analog in nature.

Figure 8A:
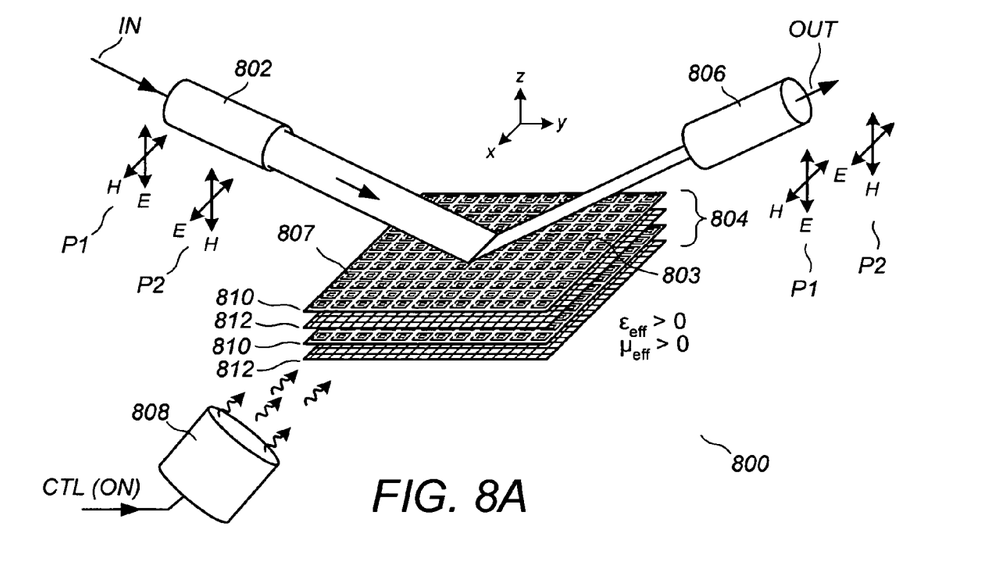
FIGS. 8A-8B illustrate a modulation device according to an embodiment for different states of a modulation signal.
Figure 8B:
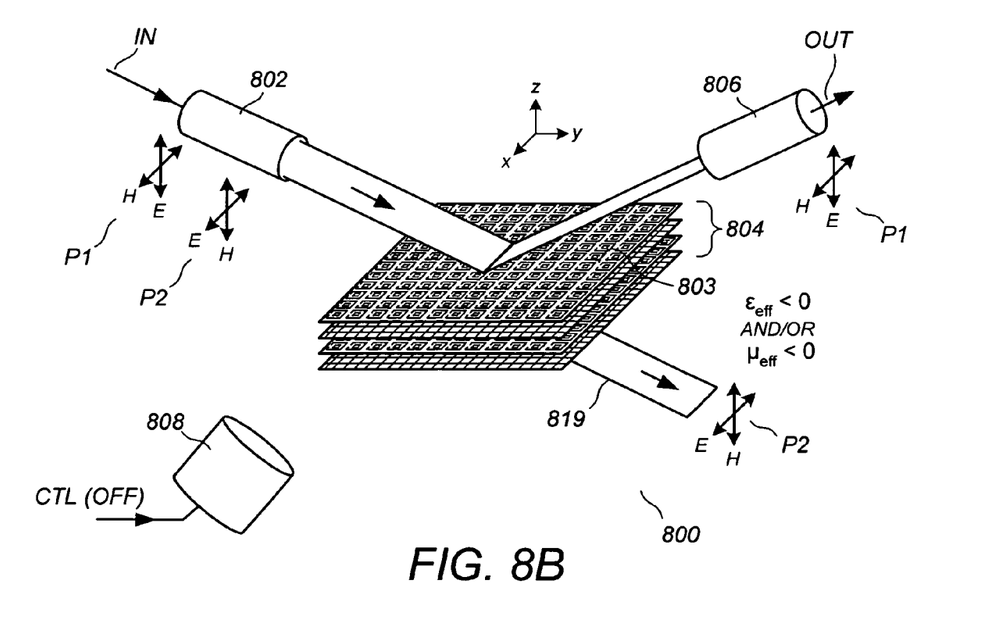

FIGS. 8A-8B illustrate a modulation device 800 according to an embodiment for different states of a modulation signal CTL. The modulation device 800 is similar in structure to the previously described modulation devices, comprising an input 802, a composite material 804 having a surface 803, an output 806, and a modulation signal application device 808, except that the composite material 804 is anisotropic such that the resonant behavior giving rise to the negative values for $\mu_{\mathit{eff}}$ and $\epsilon_{\mathit{eff}}$ is obtainable for certain polarizations but not others. This polarization selective behavior can be used to achieve useful results.

For the example of FIGS. 8A-8B, the composite material comprises alternating layers including layers 810 of split-ring resonator cells 807 and layers 812 of wire grids. The split-ring resonator cells 807 are oriented to resonate when the magnetic field H is along the z-direction, while the wire grid cells are oriented to resonate when the electric field E is parallel to the x-y plane. Accordingly, assuming for simplicity that the radiation beam approaches the surface 803 at a near-glazing angle, radiation having the polarization P2 will primarily be refracted into the composite material for a first state of the modulation signal (FIG. 8B), and will be reflected toward the output 806 for a second state of the modulation signal CTL (FIG. 8A). However, radiation having the polarization P1 will tend to reflect toward the output 806 regardless of the value of the modulation signal CTL.

Stated more loosely, radiation having the polarization P2 will tend to "see" the negative values for $\mu_{\it eff}$ and $\epsilon_{\it eff}$ while the polarization P1 will tend not to "see" the negative values for $\mu_{\it eff}$ and $\epsilon_{\it eff}$. This polarization selective behavior can be used advantageously. For example, the modulation device 800 can be operable as a polarization-selective switch or, with a second output attached to capture the refracted radiation, can serve as a controllably birefringent material. Importantly, although the previously described embodiments of FIGS. 1-7 are most easily understood in the context of isotropic composite materials (i.e., radiation traveling along each of the x, y, and z axes is treated the same), and are therefore described as such without reference to polarization for purposes of clarity, it is to be appreciated (i) that each of the embodiments of FIGS. 1-7 can be implemented with anisotropic composite materials as well, (ii) that the features and advantages of polarization selectivity can be incorporated into each such embodiment, and (iii) that the resultant devices and methods are all within the scope of the present teachings. As a general observation, it is to be noted that many typical negative-index materials tend toward being anisotropic in practice.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, although described supra as an electrical and/or optical signal in one or more embodiments, the modulation signal can be mechanical, acoustic, thermal, etc., without departing from the scope of the present teachings. By way of further example, the modulation signals applied to the composite material are not limited to scalar quantities, such as single voltages or single control beam intensities, but rather can also comprise vector or matrix quantities representative of combined control signals, spatial intensity distributions, or even holographic modulation signals.

By way of still further example, although described supra as being an optical frequency (including infrared, visible, and ultraviolet) or microwave frequency in one or more embodiments, the radiation beam being modulated can be at a radio frequency in contexts such as for large-scale radio telescope arrays, or even in the x-ray regime, without departing from the scope of the preferred embodiments. Thus, reference to the details of the described embodiments are not intended to limit their scope.

What is claimed is:

1. A method for modulating electromagnetic radiation, comprising:
    directing an incident radiation beam toward a surface of a composite material, the composite material having an arrangement of electromagnetically reactive cells of small dimension relative to a wavelength of the incident radiation beam, at least one of an effective permeability and an effective permittivity of the composite material being negative for at least one frequency;
    receiving a reflected radiation beam resulting from at least partial reflection of the incident radiation beam from said surface;
    applying a modulation signal at a first value, the reflected radiation beam having an intensity that is a first percentage of an intensity of the incident radiation beam; and
    applying a modulation signal at a second value such that at least one of said effective permeability and said effective permittivity are more negative than at said first value of said modulation signal, the intensity of the reflected radiation beam being a second percentage of the incident radiation beam intensity less than said first percentage at said second value of said modulation signal.

2. The method of claim 1, wherein said at least one characteristic of the reflected radiation beam that is modulated comprises at least one of phase, amplitude, polarization, and spectral content, wherein said at least one frequency of the incident radiation beam comprises one of a microwave frequency, an infrared frequency, and an optical frequency, and wherein said modulation signal comprises at least one of an optical signal and an electrical signal that alters at least one of an inductive property and a capacitive property of each of said arrangement of electromagnetically reactive cells.

3. The method of claim 1, said incident radiation beam comprising a first frequency and a second frequency, the method further comprising applying the modulation signal at a first value that causes (i) said effective permeability and effective permittivity to both be positive at said first frequency such that said incident radiation beam at said first frequency is significantly reflected, and that causes (ii) at least one of said effective permeability and effective permittivity to be negative at said second frequency such that said incident radiation beam at said second frequency is reflected by a substantially lesser amount than at said first frequency.

4. The method of claim 1, said incident radiation beam comprising a plurality of frequencies, the method further comprising applying the modulation signal at one of a plurality of values that causes (i) said effective permeability and effective permittivity to both be positive for a first subset of said frequencies such that said incident radiation beam for the first subset of frequencies is significantly reflected, and that causes (ii) at least one of said effective permeability and effective permittivity to be negative for a second subset of said frequencies non-overlapping with said first subset such that said incident radiation beam at said second subset of said frequencies is reflected by a substantially lesser amount than at said first subset of frequencies.

5. The method of claim 4, said composite material forming a part of a first device having an input port receiving said incident radiation beam and an output port outputting said reflected radiation beam, the method further comprising:
    directing the reflected radiation beam toward an input port of a first of a plurality of additional devices similar to said first device and having respective input and output ports in radiative communication with each other; and
    directing a plurality of additional respective incident radiation beams toward respective ones of said input ports for providing add-drop multiplexing for said incident radiation beams.

6. The method of claim 1, said incident radiation beam comprising a first polarization and a second polarization, said arrangement of electromagnetically reactive cells being anisotropic such that said at least one negative effective permeability and negative effective permittivity are obtainable for said first polarization and not obtainable for said second polarization, the method further comprising:
    applying said modulation signal at a first value such that both said effective permeability and said effective permittivity are positive for said first polarization, the incident radiation beam primarily reflecting at said surface for both said first and second polarizations and the reflected radiation beam comprising both said first and second polarizations;
    applying said modulation signal at a second value such that at least one of said effective permeability and said effective permittivity are negative for said first polarization, the incident radiation beam primarily refracting into the composite material for said first polarization, wherein said reflected radiation beam comprises primarily said second polarization and said refracted radiation beam comprises primarily said first polarization;
receiving said reflected radiation beam at a first receiving location; and
receiving said refracted radiation beam at a second receiving location spatially distinct from said first receiving location.

7. The method of claim 1, further comprising:
applying said modulation signal at a first value, the reflected radiation beam having a first phase shift relative to said incident radiation beam; and
applying said modulation signal at a second value such that at least one of said effective permeability and said effective permittivity are more negative than at said first value of said modulation signal, the reflected radiation beam having a second phase shift relative to said incident radiation beam.

8. The method of claim 7, said composite material being a first composite material, said incident radiation beam being a first incident radiation beam, said reflected radiation beam being a first reflected radiation beam, said modulation signal being a first modulation signal, the method further comprising:
splitting an input carrier beam into two beams comprising said first incident radiation beam and a second incident radiation beam, said first incident radiation beam being incident upon the surface of said first composite material;
directing said second incident radiation beam toward a surface of a second composite material substantially similar to said first composite material, a second reflected radiation beam resulting from at least partial reflection of the second incident radiation beam from said surface of the second composite material;
applying a second modulation signal at third and fourth values to said second composite material to cause said second reflected radiation beam to have third and fourth phase shifts, respectively, relative to said second incident radiation beam; and
combining said first and second reflected radiation beams to form an output radiation beam that is a modulated version of said input carrier beam as modulated according to said first and second modulation signals.

9. A method for modulating electromagnetic radiation, comprising:
directing an incident radiation beam toward a surface of a composite material, the composite material having an arrangement of electromagnetically reactive cells of small dimension relative to a wavelength of the incident radiation beam, at least one of an effective permeability and an effective permittivity of the composite material being negative for at least one frequency;
receiving a reflected radiation beam resulting from at least partial reflection of the incident radiation beam from said surface;
applying the modulation signal at a first value such that both said effective permeability and said effective permittivity are positive, the incident radiation beam primarily reflecting at said surface, the reflected radiation beam having an intensity that is a relatively high percentage of an intensity of the incident radiation beam; and
applying the modulation signal at a second value such that at least one of said effective permeability and said effective permittivity are negative, the incident radiation beam primarily refracting into the composite material, the intensity of the reflected radiation beam being a relatively low percentage of the incident radiation beam intensity.

10. The method of claim 9, a refracted radiation beam being formed from said refraction of said incident radiation beam into the composite material for said second value of said modulation signal, further comprising:
dynamically varying the modulation signal between said first and second values;
receiving said reflected radiation beam at a first receiving location; and
receiving said refracted radiation beam at a second receiving location spatially distinct from said first receiving location.

11. A device for modulating radiation, comprising a composite material formed by an arrangement of electromagnetically reactive cells of small dimension relative to a wavelength of an incident radiation beam, the composite material having a surface from which the incident radiation beam at least partially reflects to result in a reflected radiation beam and the composite material can be operated such that the incident beam at least partially refracts to result in a refracted radiation beam, the composite material having at least one of a negative effective permeability and a negative effective permittivity for at least one frequency, wherein at least one of an inductive property and a capacitive property of said electromagnetically reactive cells is controlled by application of a modulation signal such that at least one characteristic of the reflected radiation beam and/or refracted radiation beam are modulated according to said modulation signal.

12. The device of claim 11, wherein said at least one characteristic of the reflected radiation beam that is modulated comprises at least one of phase, amplitude, polarization, and spectral content, wherein said at least one frequency of the incident radiation beam comprises one of a microwave frequency, an infrared frequency, and an optical frequency, and wherein said modulation signal comprises at least one of an optical signal and an electrical signal.

13. The device of claim 11, further comprising:
a first input port for receiving the incident radiation beam and directing the incident radiation beam to said surface of the composite material;
a second input port for receiving the modulation signal and applying the modulation signal to said electromagnetically reactive cells; and
a first output port for receiving the reflected radiation beam from said surface of said composite material, said composite material being configured such that both said effective permeability and effective permittivity are positive for a first value of said modulation signal to cause said incident radiation beam to reflect from said surface, said composite material further being configured such that at least one of said effective permeability and effective permittivity are negative for a second value of said modulation signal such that at least a portion of said incident radiation beam is refracted into said composite material, wherein said reflected radiation beam has a greater intensity for said first modulation signal value than for said second modulation signal value, whereby said device is operable as an intensity modulator according to said values of said modulation signal.

14. The device of claim 13, further comprising a second output port positioned to receive the refracted radiation beam, whereby said device is operable as a two-way switch according to said values of said modulation signal.

15. The device of claim 11, said incident radiation beam comprising a first frequency and a second frequency, said composite material being configured such that, for a first modulation signal value, both said effective permeability and effective permittivity are positive for said first frequency and at least one of said effective permeability and effective permittivity is negative for said second frequency, whereas for a second modulation signal value, both said effective permeability and effective permittivity are positive for said second frequency and at least one of said effective permeability and effective permittivity is negative for said first frequency, the device further comprising:
- a through port positioned to receive the reflected radiation beam, said surface primarily reflecting the incident radiation beam at frequencies for which both of said effective permeability and effective permittivity are positive; and
- a drop port positioned to receive a refracted beam resulting from a refraction of the incident radiation beam into the composite material, said surface primarily refracting the incident radiation beam into the composite material at frequencies for which at least one of said effective permeability and effective permittivity are negative, whereby said device is operable as a channel dropping device that is tunable according to said modulation signal value.

16. The device of claim 11, further comprising:
- a first input port for receiving the incident radiation beam and directing the incident radiation beam to said surface of the composite material;
- a second input port for receiving the modulation signal and applying the modulation signal to said electromagnetically reactive cells; and
- a first output port for receiving the reflected radiation beam from said surface of said composite material, said composite material having a resonance frequency at which both of said effective permeability and effective permittivity are negative, wherein for a first carrier frequency of said incident radiation near said resonant frequency, said reflected radiation beam has a first phase shift relative to said incident radiation beam for a first value of said modulation signal and a second phase shift relative to said incident radiation beam for a second value of said modulation signal, whereby said device is operable as a phase modulator at said first carrier frequency according to said modulation signal.

17. A tunable add-drop multiplexer for adding channels to a radiation beam and removing channels from the radiation beam, comprising:
- a plurality of add-drop stages disposed in serial radiative communication relative to the radiation beam, each add-drop stage being configured to drop a channel at a drop frequency and to pass at least one channel at a pass frequency different than said drop frequency, each add-drop stage comprising a composite material formed by an arrangement of electromagnetically reactive cells of small dimension relative to a wavelength of the radiation beam, the composite material having both a positive effective permeability and a positive effective permittivity at said pass frequency and having at least one of a negative effective permeability and a negative effective permittivity at said drop frequency, said composite material having a surface that passes said at least one channel at said pass frequency by reflection therefrom and that drops said drop channel at said drop frequency by refraction thereinto; and
- for each add-drop stage, a modulation signal application device for applying a modulation signal to said composite material that varies said drop frequency by varying at least one of a capacitive property and inductive property of said arrangement of electromagnetically reactive cells.

18. The tunable add-drop multiplexer of claim 17, wherein said drop frequency and pass frequency are each in one of a microwave frequency range, an infrared frequency range, and an optical frequency range.

19. The tunable add-drop multiplexer of claim 17, wherein said modulation signal comprises at least one of an optical signal and an electrical signal.

20. The tunable add-drop multiplexer of claim 17, wherein said composite material exhibits both said negative effective permeability and said negative effective permittivity at said drop frequency.

21. A Mach-Zehnder apparatus for modulating an incident radiation beam, comprising:
- a radiation splitter that splits the incident radiation beam into a plurality of substantially equal split beams and directs each split beam along a distinct propagation path;
- a plurality of phase modulators positioned along respective ones of said distinct propagation paths, each of said phase modulators comprising a composite material modulating the phase of the split beam by reflection from a surface thereof, the composite material comprising an arrangement of electromagnetically reactive cells of small dimension relative to a wavelength of the incident radiation beam, the composite material having at least one of a negative effective permeability and a negative effective permittivity at a frequency of said split beam;
- for each of said phase modulators, a modulation signal application device for applying a modulation signal that varies at least one of a capacitive property and inductive property of said arrangement of electromagnetically reactive cells to correspondingly vary the phase of the split beam; and
- a radiation combiner that combines said plurality of phase-modulated split beams into an output radiation beam.

22. The Mach-Zehnder apparatus of claim 21, wherein said phase modulators are operative in one of a microwave frequency range, an infrared frequency range, and an optical frequency range.

23. The Mach-Zehnder apparatus of claim 21, wherein said modulation signal comprises at least one of an optical signal and an electrical signal.

* * * * *